United States Patent [19]
Alexander

[11] 3,913,004
[45] Oct. 14, 1975

[54] METHOD AND APPARATUS FOR INCREASING ELECTRICAL POWER

[75] Inventor: Robert W. Alexander, Pasadena, Calif.

[73] Assignee: Alex, Pasadena, Calif.

[22] Filed: Nov. 18, 1974

[21] Appl. No.: 524,556

[52] U.S. Cl. .................................. 321/28; 321/50
[51] Int. Cl.² ........................................ H02M 7/64
[58] Field of Search ........ 310/113, 165; 321/28, 29, 321/30, 31, 48, 49, 50

[56] References Cited
UNITED STATES PATENTS

| | | |
|---|---|---|
| 2,640,181 | 5/1953 | Korzdorfer .................... 321/28 X |
| 3,078,409 | 2/1963 | Bertsche, Jr. et al. ............ 321/28 X |
| 3,223,916 | 12/1965 | Shafranek et al. ................ 321/28 |

Primary Examiner—William M. Shoop

[57] ABSTRACT

A form of rotating machine arranged in such a way as to convert a substantially constant input voltage into a substantially constant output voltage; involving generally a rotor that revolves at substantially constant speed within a stator and which comprises a transformer core subjected to and having a primary motor-transformer winding and a secondary transformer-generator winding; whereby transformed and generated power are synchronously combined as increased output power.

27 Claims, 3 Drawing Figures

METHOD AND APPARATUS FOR INCREASING ELECTRICAL POWER

BACKGROUND

Electrical power is frequently changed in voltage, phase, frequency, and the current from alternating to direct or from direct to alternating. Voltage conversion in A.C. circuits is usually by means of transformers; and in D.C. circuits is usually by means of motor-generators. Phase conversion is also accomplished by either transformers or motor-generators; and frequency conversion is most simply done by motor-generators. Motor-generators have various classifications of use, as follows: (1) D.C. to D.C. used to charge batteries and to boost voltage; (2) A.C. to A.C. used for frequency and phase conversion; (3) A.C. to D.C. used for all types of service, such as battery charging, generator and motor field excitation, railways, electrolysis, and speed control etc.; and (4) D.C. to A.C. used to limited extent for special applications. To these ends combination motor-generators have been built, such as dynamotors stepping up D.C. voltage for radio equipment and amplidynes for reproducing a weak signal at a higher power level. When a particular variable frequency A.C. is required of a motor-generator set and the power supply is D.C., the equipment will include a D.C. motor for variable speed and a separate alternator driven thereby. Such equipment is special in nature and characterized by separation of the motor and generator and by polyphase (usually three-phase) generator windings and with auto transformers having suitable taps for obtaining the required voltages; and a D.C. speed controller for the motor. The phase output of such equipment is selective and its single phase capacity necessarily restricted (66%) as compared with its three-phase capacity, in which case transmission efficiency for single phase is poor. When a higher level power output is desired, the amplidyne is employed with field windings and brushes equipped for the purpose, and in some instances to give a constant current output from a constant voltage input, for example in inverted rotary converter provided to convert D.C. to A.C. However, the present invention is concerned with method and apparatus for increasing electrical power and provides a dynamo-electric converter that operates from an electrical energy supply to most efficiently produce A.C. for a useful load. The method involves simultaneous motor-transformer-generator steps and the preferred embodiment of the apparatus involves a dynamo-electric converter (DEC) in the form of a rotary machine combined in a single rotor revolving within a stator, the rotor being comprised of a transformer core subjected to both a primary motor-transformer winding and a secondary transformer-generator winding, and the stator being comprised of magnetic field poles.

Synchronous converters have been combined in single rotor machines to produce D.C. from A.C., but that effect is quite different from the effect of the present invention when A.C. is to be produced from D.C. in a single rotor having primary and secondary armature windings as distinguished from armature windings common to both A.C. and D.C. circuits. With the present invention, both a transforming and a generating effect are conducted in the rotor, and all of which is inherently synchronized and delivered through the A.C. outlet leads. A.C. motors and D.C. generators have been combined in one machine, that is in one rotor, and referred to as synchronous converters. However, synchronous converters are lacking in their ability to change D.C. into A.C. when operating from the former as a prime mover to simultaneously drive a generator, and more specifically to synchronously drive an alternator.

SUMMARY OF INVENTION

This method involves the placement of a primary winding in a field to both motor the same and to have a transformer effect with respect to a secondary winding also in a field to have a generator effect. In its preferred embodiment, this dynamo-electric converter is comprised of primary and secondary windings combined in a rotor commutated to alternate a D.C. energy supply in and thereby motivate the rotor within a stator field. The primary winding is advantageously of fewer turns than the secondary and by means of electromotive force drives the secondary windings of more turns to cut the magnetic lines of force for the generation of electrical energy at a higher voltage level than the D.C. supply. This D.C. operated motor is shunt wound with the stator field poles fully energized by the D.C. energy supply, or is provided with permanent magnet field poles, to efficiently motivate the rotor and efficiently generate electrical energy in the secondary windings. The A.C. output of the secondary windings is inherently synchronized with the transformer function of the primary windings combined in the common slots of the single rotor; and by adding the transformer and generator voltages and amperages the wattage is correspondingly increased at the output.

DRAWINGS

The various objects and features of this invention will be fully understood from the following detailed description of the typical preferred form and application thereof, throughout which description reference is made to the accompanying drawings, in which.

PREFERRED EMBODIMENT

Figure 1:
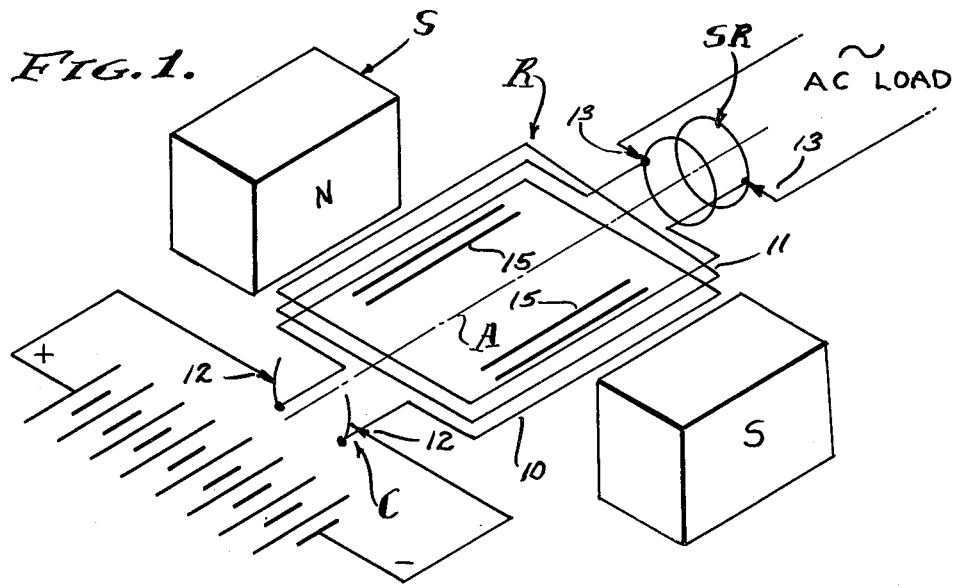
FIG. 1 is a diagrammatic schematic view of the dynamo-electric converter components comprising the present invention.
Figure 2:
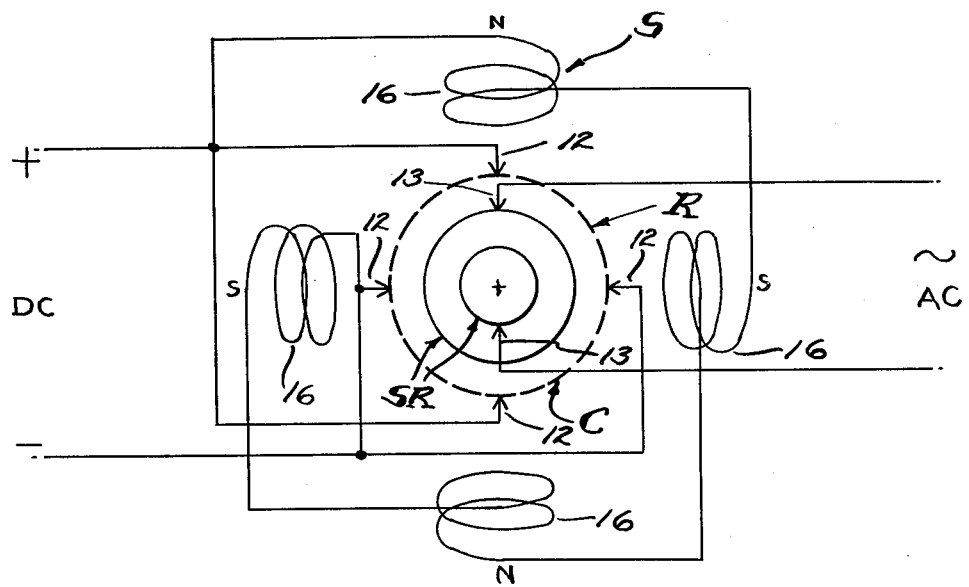
FIG. 2 is a diagram of a typical commutator brush, slip ring brush and field pole arrangement that is utilized.

The dynamo-electric converter is diagrammatically illustrated in the drawings and involves, generally, a rotor R carried upon spaced bearings B so as to rotate on an axis A concentric within a stator S. The rotor R comprises the armature while the stator S comprises the field, there being a commutator C associated with primary windings 10 on the rotor and slip rings SR associated with secondary windings 11 on the rotor. Brushes 12 and 13 are slideably engaged with the commutator and slip rings respectively, by conventional means, to conduct D.C. through the commutator C and to conduct A.C. through the slip rings SR. The brushes 12 and interconnected primary windings 10 comprise a motor while the brushes 13 and interconnected secondary windings 11 comprise a generator or alternator.

In practice, the field windings 16 can be separately energized or connected in parallel with the brushes 12 or shunted with respect to the primary motor winding 10. Motorization of the armature rotor R, or motoring thereof, causes continued polarity reversals on a cycle basis as determined by the speed of rotation, and this of course results in magnetic reversals in the rotor core 15 and a consequent induction in the secondary windings 11. A feature of this invention is the combining and cooperative relationship of the primary and secondary windings which occupy common slots in and embrace a common portion of the core 15 of the rotor R, thereby to have a transformer function as well as a generator function as the lines of magnetic force are cut by the secondary windings. The stator S has field poles of opposite magnetic polarity, excited independently from the armature, or as permanent magnets, and preferably shunted across the D.C. input. As shown, there are four equally spaced field poles in a circumferentially disposed series.

In practice, the primary D.C. motor windings are of fewer turns in the rotor slots than the secondary A.C. generator windings. For example the primary motor windings 10 are flat wound between north to south poles of the field while the secondary generator windings are flat wound in the same or common slots of the rotor armature. In a typical unit having a four brush commutator with 20 bars and having a 20 slot armature, the primary windings 10 are comprised of a number of turns of conductor to efficiently draw 48 volts D.C. at 25 amperes or 1200 Watts to rotate at 1750 RPM; while the secondary windings 11 are comprised of a number of turns of conductor to efficiently deliver 60 cycle (by transforming and generating) 110 volts A.C. at 32 amperes or 3520 Watts; the volt meter used to read these values upon an actual reduction to practice being calibrated to read the root-mean-square (rms) value of the pure sine wave, which is 70.7% of the peak voltage.

The reduction to practice hereinabove referred to as a "typical unit" was constructed of a machine originally designed as a self exciting 60 cycle 110 volt 2.5 KVA generator to be shaft driven by a separate prime mover. Firstly, the said prime mover was eliminated. The exciter windings were intended to excite the field at 45 volts D.C. delivered through the commutator, while the generator windings were intended to independently deliver 110-120 volts A.C. through the slip rings. The winding ratio between the exciter and generator windings was approximately one to three, and these are the values which determined the values employed in the present reduction to practice. However, it is to be understood that other values can be employed by design, for operation at the desired input and output voltages and amperages. It is also to be understood that the example reduction to practice disclosed herein is not necessarily the optimum design, in that other input-output power balances are contemplated, such as a D.C. battery input voltage substantially equal to the A.C. power voltage. In any case, an unexpected increase in power is realized by practicing this invention.

This dynamo electric converter inherently operates at a substantially constant angular velocity with the result that the alternating cycles of the output are substantially constant. Also, the D.C. input voltage can be maintained at a substantially constant level with the result that the A.C. output voltage is also substantially constant. As shown, the output is single phase A.C. in which case the effective power in Watts delivered is the product of current, voltage and power factor. Since the voltage is substantially constant, the current varies with load applied to the output as it is affected by the power factor. It will be seen therefore, that the apparent power represented by voltage times amperage is drawn directly from the D.C. input and applied to the primary motor winding 10 to motivate the rotor R for the functions hereinabove described. It will also be seen therefore, that the D.C. input is commutated into A.C. and transformed by induction from windings 10 into windings 11. And it will also be seen therefore, that the A.C. generated by motorization of the motor is synchronously imposed upon the windings 11, and all to the end that the two alternating currents are complementary and one added to the other. It will be observed that the output wattage is approximately triple the input wattage, by virtue of the synchronous superimposing of transformed input voltage and generated voltage while utilizing the former to operate the rotor in order to generate the latter. A feature of this invention is the separation of the primary and secondary circuits and the consequent isolation of the inverted input D.C. from the outlet A.C. and the utilization of input energy comensurate with output load according to amperage required for the operations to which this DEC machine is applied.

In carrying out this invention, the dynamo electric machine is conventional in design and the primary and secondary windings 10-11 are wound into the common slots of the armature as they are in self exciting generators. However, the primary windings 10 are motor-transformer windings and function totally as such. Similarly, the secondary windings 11 are wound into the armature slots together with the primary windings 10 and are powered with current that is alternated by virtue of the commutation and rotation of the armature, and consequently there is a transformer action between the primary windings 10 and secondary windings 11; and this transformer function is supplemented by generation of a superimposed current by virtue of the secondary windings 11 cutting the magnetic lines of force provided by the surrounding stator field. Consequently, there is a multiplying of power synchronously applied through the slip rings SR to the output brushes 13, and this increased output power is measurable as hereinabove described and double or almost triple that of the input power.

METHOD

Referring now to this method of increasing electrical power, input alternating current is applied to a primary winding to both motor and alternately magnetize a core. The said primary winding is immersed in a field and consequently is caused to motor and simultaneously to perform the first stage of transforming. A second stage of transforming is then performed by a secondary winding associated with said core to function as both a transformer and a generator winding, and the output current is drawn therefrom at an increased power value as compared with the input power; since the current induced by transformer action is superimposed upon the current generated in cutting the magnetic lines of force by motoring the secondary winding through said field. The direct application of A.C. power to the primary winding is contemplated, however the present and preferred embodiment employs commutation of D.C. power which is thereby inverted to A.C. power in the process of motoring said windings and the core means in which they are carried together with the secondary winding. The net result is three fold, in that there is a motoring function, a transforming function, and a generating function; all of which are inherently synchronized to increase the output power with respect to the input power.

Figure 3:
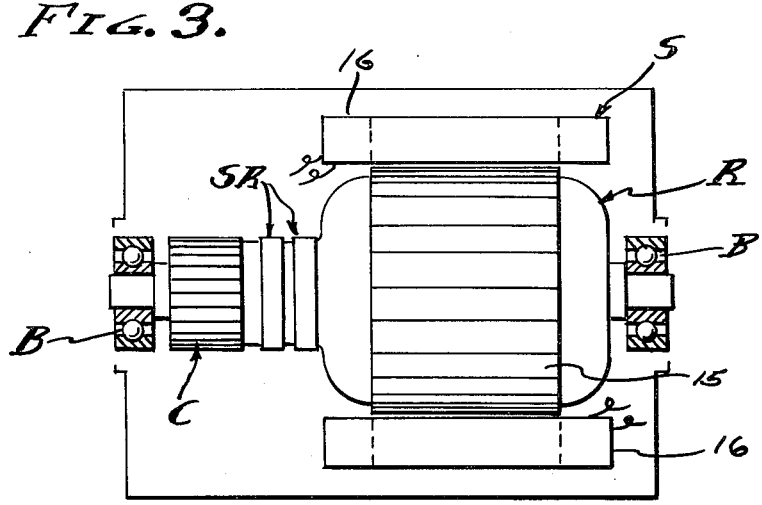
FIG. 3 is a longitudinal section through a machine embodying the stator and rotor on bearings with the frame and brushes removed.
Figure 4:
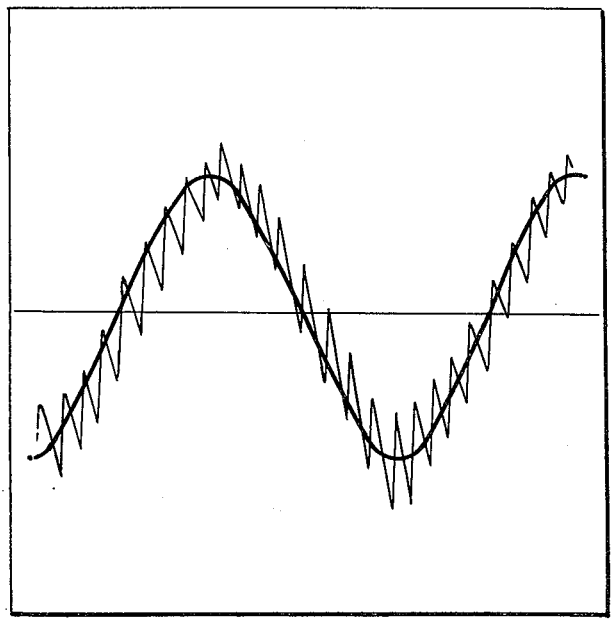
FIG. 4 is a typical duplicate of an osciloscope diagram showing the power output of the dynamo-electric converter.

From the foregoing it will be seen that this method, and the dynamo-electric converter termed a DEC, synchronously superimposes transformed electrical energy and mechanically generated electrical energy when inverting D.C. to A.C. as is shown by observing the osciliscope diagram duplicated in FIG. 3 of the drawings. The D.C. motor section of the rotor-stator unit will operate at its designed speed well within a small tolerance, by applying known engineering principles; and consequently the A.C. generator-alternator section thereof will operate at a substantially uniform frequency of, for example, 60 cycles per second. Thus, the output voltage potential is kept to a maximum while current is drawn as required, within the capacity of the unit design.

Having described only a typical preferred form and application of my invention, I do not wish to be limited or restricted to the specific details herein set forth, but wish to reserve to myself any modifications or variations that may appear to those skilled in the art:

I claim:

1. A dynamo-electric converter for inverting direct current voltage to alternating current voltage and including; a magnetic field having poles of opposite polarity, an armature coaxial with the field and having a core with means to receive windings, coaxial bearing means between the field and the armature, a primary motor-transformer winding in said means of the armature core and a commutator connected therewith, direct current input brushes engageable with the said commutator, a secondary transformer-generator winding in said means of the armature core and slip rings connected therewith, and alternating current output brushes engageable with the said slip rings, whereby direct current input power is both transformed and regenerated as alternating output power.

2. The dynamo-electric converter as set forth in claim 1, wherein the magnetic field is a stator comprised of said poles of opposite polarity, and wherein the armature is a rotor supported upon said bearing means coaxially within said field.

3. The dynamo-electric converter as set forth in claim 1, wherein the means to receive windings is a pair of slots in the armature core, said primary and secondary windings being carried in the slots and subjected to the magnetic capabilities of the core.

4. The dynamo-electric converter as set forth in claim 1, wherein the means to receive windings is a multiplicity of slots disposed in a circumferential series about the armature core, said primary and secondary windings being circumferentially progressive windings respectively and carried in common slots respectively and subjected to the magnetic capabilities of the core.

5. The dynamo-electric converter as set forth in claim 1, wherein the magnetic field poles are permanent magnets.

6. The dynamo-electric converter as set forth in claim 1, wherein the magnetic field poles are electro magnets energized separately from the said primary motor winding.

7. The dynamo-electric converter as set forth in claim 1, wherein the field poles are electro magnets energized in parallel with the direct current input brushes engageable with the commutator.

8. The dynamo-electric converter as set forth in claim 1, wherein the magnetic field is a stator comprised of said poles of opposite polarity, wherein the armature is a rotor supported on said bearing means coaxially within said field, and wherein the means to receive windings is a pair of slots in the armature core, said primary and secondary windings being carried in the slots and subjected to the magnetic capabilities of the core.

9. The dynamo-electric converter as set forth in claim 1, wherein the magnetic field is a stator comprised of permanent magnet poles of opposite polarity, wherein the armature is a rotor supported on said bearing means coaxially within said field, and wherein the means to receive windings is a pair of slots in the armature core, said primary and secondary windings being carried in the slots and subjected to the magnetic capabilities of the core.

10. The dynamo-electric converter as set forth in claim 1, wherein the magnetic field is a stator comprised of permanent magnet poles of opposite polarity, wherein the armature is a rotor supported on said bearing means coaxially within said field, and wherein the means to receive windings is a multiplicity of slots disposed in a circumferential series about the armature core, said primary and secondary windings being circumferentially progressive windings and carried in common slots respectively and subjected to the magnetic capabilities of the core.

11. The dynamo-electric converter is set forth in claim 1, wherein the magnetic field poles are electro magnets of opposite polarity energized in parallel with the direct current input brushes engageable with the commutator, wherein the means to receive windings is a multiplicity of slots disposed in a circumferential series about the armature core, said primary and secondary windings being circumferentially progressive windings respectively and carried in common slots respectively and subjected to the magnetic capabilities of the core.

12. A method for increasing electrical power and comprised of; placing a primary winding within the flux of a magnetic field and applying alternating current therethrough while motoring the same to revolve, simultaneously revolving a secondary winding with the primary winding and through a flux of a magnetic field, and simultaneously transforming the first mentioned alternating current from the primary winding and into the secondary winding while synchronously generating alternating current in the secondary winding.

13. The method of increasing electrical power as set forth in claim 12 wherein the magnetic field is held stationary and the primary and secondary windings revolved together.

14. The method of increasing electrical power as set forth in claim 12 wherein the primary and secondary windings are related to a common armature synchronously inducing into and generating electrical power through the secondary winding.

15. The method of increasing electrical power as set forth in claim 12 wherein the first mentioned alternating current is commutated from direct current to alternating current by revolvement of said primary winding.

16. The method of increasing electrical power as set forth in claim 12 wherein the magnetic field is held stationary and the primary and secondary windings revolved together and related to a common armature synchronously inducing into and generating electrical power through the secondary winding.

17. The method of increasing electrical power as set forth in claim 12 wherein the first mentioned alternating current is commutated from direct current to alternating current by revolvement of said primary winding and the primary and secondary windings related to a common armature synchronously inducing into and generating electrical power through the secondary winding.

18. The method of increasing electrical power as set forth in claim 12 wherein the first mentioned alternating current is commutated from direct current to alternating current by revolvement of said primary winding and wherein the magnetic field is held stationary and the primary and secondary windings revolved together and related to a common armature synchronously inducing into and generating electrical power through the secondary winding.

19. A dynamo-electric machine including; a first means applying a first alternating current into a primary motor-transformer winding, and a second means inducing a second alternating current into a secondary transformer-generator winding, said secondary winding being carried by said second means to operate through a flux of a field and thereby generating a third alternating current, whereby said second and third alternating currents are synchronously superimposed one upon the other.

20. The dynamo-electric machine as set forth in claim 19 wherein the field is stationary and the primary and secondary windings are rotary.

21. The dynamo-electric machine as set forth in claim 19 wherein the field is stationary and the primary and secondary windings are rotary with commutator bars synchronously applying a direct current to motorize the armature and to apply said first alternating current thereto.

22. The dynamo-electric machine as set forth in claim 19 wherein the transformer means comprises magnetic core means common to the primary and secondary windings.

23. The dynamo-electric machine as set forth in claim 19, wherein the field is stationary and the primary and secondary windings are rotary with commutator bars synchronously applying a direct current to motorize the armature and to apply said first alternating current thereto, and wherein the transformer means comprises magnetic core means common to the primary and secondary windings.

24. A rotary dynamo-electric machine including: means applying alternating current through a primary motor-transformer winding carried by an armature core carrying a secondary transformer-generator winding, a field, and bearing means for rotation of the armature core relative to the field, whereby the alternating current applied to the primary winding motors the armature and is transformed and an alternating current generated and superimposed thereon through the secondary winding for increased output power.

25. The rotary dynamo-electric machine as set forth in claim 24 wherein the primary and secondary windings are each comprised of a number of turns of conductor to transform the first mentioned applied alternating current to the voltage of the alternating current generated through the secondary winding.

26. The rotary dynamo-electric motor as set forth in claim 24 wherein the first mentioned applied alternating current is of different voltage than the increased output power and wherein the primary and secondary windings are each comprised of a number of turns of conductor to transform the first mentioned applied alternating current to the voltage of the alternating current generated through the secondary winding.

27. The rotary dynamo-electric machine as set forth in claim 24 wherein the first mentioned applied alternating current is of lower voltage than the increased output power and wherein the primary and secondary windings are each comprised of a number of turns of conductor to transform the first mentioned applied alternating current to the voltage of the alternating current generated through the secondary winding.

* * * * *